US009083786B2

(12) United States Patent
Uusitalo

(10) Patent No.: US 9,083,786 B2
(45) Date of Patent: *Jul. 14, 2015

(54) ELECTRONIC DEVICE FOR IDENTIFYING A PARTY

(71) Applicant: Core Wireless Licensing S.A.R.L., Luxembourg (LU)

(72) Inventor: Jussi Severi Uusitalo, Hameenlinna (FI)

(73) Assignee: Core Wireless Licensing S.a.r.l, Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 14/251,761

(22) Filed: Apr. 14, 2014

(65) Prior Publication Data

US 2014/0221046 A1    Aug. 7, 2014

Related U.S. Application Data

(63) Continuation of application No. 11/388,837, filed on Mar. 23, 2006, now Pat. No. 8,724,785.

(51) Int. Cl.
*H04M 3/42* (2006.01)
*H04M 1/64* (2006.01)
*H04M 1/56* (2006.01)
*H04M 15/06* (2006.01)
*H04M 1/247* (2006.01)
*H04M 1/2745* (2006.01)

(52) U.S. Cl.
CPC .......... *H04M 1/2471* (2013.01); *H04M 1/2745* (2013.01); *H04M 1/56* (2013.01); *H04M 1/274508* (2013.01); *H04M 2250/74* (2013.01)

(58) Field of Classification Search
CPC ............ H04M 1/2471; H04M 1/2745; H04M 1/274508; H04M 1/56; H04M 2250/74

USPC .......... 379/67.1, 68, 85, 88.01, 88.02, 88.11, 379/88.13, 88.19, 88.21, 93.23, 142.01, 379/142.04, 142.05, 142.06, 201.01, 379/201.02, 201.07, 207.13, 207.15, 379/355.01, 355.02, 372, 373.01, 373.02; 455/414.1, 415

See application file for complete search history.

(56) References Cited

U.S. PATENT DOCUMENTS

| | | | | |
|---|---|---|---|---|
| 5,787,159 A * | 7/1998 | Hamilton et al. | ........ | 379/142.01 |
| 5,907,604 A * | 5/1999 | Hsu | .......... | 379/142.06 |
| 6,681,004 B2 * | 1/2004 | Strubbe et al. | .......... | 379/142.06 |
| 7,035,386 B1 * | 4/2006 | Susen et al. | ................ | 379/93.02 |
| 7,136,458 B1 * | 11/2006 | Zellner et al. | .............. | 379/88.02 |
| 7,379,544 B2 * | 5/2008 | Katz | ........................ | 379/210.02 |
| 8,724,785 B2 * | 5/2014 | Uusitalo | .................. | 379/201.01 |
| 2001/0042114 A1 * | 11/2001 | Agraharam et al. | ......... | 709/223 |
| 2002/0118803 A1 * | 8/2002 | Mahoney | .................... | 379/88.03 |
| 2002/0136378 A1 * | 9/2002 | Strubbe et al. | ........... | 379/142.01 |
| 2006/0190626 A1 * | 8/2006 | Bhogal et al. | ................. | 709/248 |
| 2006/0203012 A1 * | 9/2006 | Nakajima | ..................... | 345/629 |
| 2007/0142035 A1 * | 6/2007 | Lee | ............................. | 455/414.1 |
| 2007/0223682 A1 * | 9/2007 | Uusitalo | ................... | 379/355.01 |
| 2014/0221046 A1 * | 8/2014 | Uusitalo | ........................ | 455/563 |

* cited by examiner

*Primary Examiner* — Khai N Nguyen
(74) *Attorney, Agent, or Firm* — Core Wireless Licensing

(57) ABSTRACT

Embodiments of the present invention provide a method of associating first data identifying a first party with second data to allow future recognition of the first party, including the steps of: conducting a telephone call with the first party; storing second data derived from the telephone call with the first party, the second data being different to the first data and characterizing a feature of the first party to allow future recognition of the first party; and associating the first data with the second data.

12 Claims, 7 Drawing Sheets

ELECTRONIC DEVICE FOR IDENTIFYING A PARTY

CROSS-REFERENCE TO RELATED APPLICATIONS

This patent application is a continuation of U.S. patent application Ser. No. 11/388,837, filed on Mar. 23, 2006, which is now U.S. Pat. No. 8,724,785. U.S. patent application Ser. No. 11/388,837 is incorporated herein by reference.

FIELD OF THE INVENTION

Embodiments of the present invention relate to an electronic device for identifying a party. In particular, they relate to a mobile radiotelephone for identifying a party using recognition technology.

BACKGROUND TO THE INVENTION

The number of features that are integrated into a single electronic device has been increasing in recent years. This has been particularly evident in the case of mobile radiotelephones, which offer many features over and above the ability to make telephone calls.

Increasing the number of features that are integrated into a single electronic device may result in the user interface for the device becoming more and more complex. This makes the user interface difficult to learn to use. For instance, a user may have to negotiate many different levels of a menu system before he can change a certain option or setting.

BRIEF DESCRIPTION OF THE INVENTION

It would be desirable to provide an improved user interface for an electronic device. It would also be desirable to automate aspects of the user interface.

According to a first embodiment of the invention there is provided a method of associating first data identifying a first party with second data to allow future recognition of the first party, comprising the steps of: conducting a telephone call with the first party; storing second data derived from the telephone call with the first party, the second data being different to the first data and characterizing a feature of the first party to allow future recognition of the first party; and associating the first data with the second data.

By providing a method in which first data identifying a first party is associated with second data characterizing a feature of the first party, embodiments of the invention advantageously enable a user to identify the first party in future telephone calls or data. Furthermore, as the second data is derived from a telephone call with the first party, there is no need for the first party to provide information to an electronic device with the sole purpose of enabling the device to identify the first party in the future.

According to a second embodiment of the invention there is provided an electronic device, comprising: a transceiver for conducting a telephone call with a first party; a storage device or devices for storing first data identifying the first party and second data derived from a telephone call with the first party, the second data being different to the first data and characterizing a feature of the first party to allow future recognition of the first party by the electronic device; and a processor for associating the first data with the second data.

According to a third embodiment of the invention there is provided a computer program for associating first data identifying a first party with second data to allow future recognition of the first party, comprising: means for instructing a memory to store second data derived from a telephone call with the first party, the second data being different to the first data and characterizing a feature of the first party to allow future recognition of the first party; and means for associating the first data with the second data.

According to a fourth embodiment of the invention there is provided a method for retrieving first data identifying a first party, comprising the steps of: storing second data, different to the first data, characterizing a feature of the first party; associating the first data with the second data; comparing third data with the second data to determine whether the third data comprises the feature of the first party; and retrieving the first data associated with the second data if the third data comprises the feature of the first party.

By providing a method in which first data identifying a first party is retrieved if third data comprises the feature of the first party, embodiments of the invention advantageously enable a party that is featured in the third data to be identified.

According to a fifth embodiment of the invention there is provided an electronic device, comprising: a storage device or devices for storing first data identifying a first party and for storing second data, different to the first data, characterizing a feature of the first party; and a processor for associating the first data with the second data, for comparing third data with the second data to determine whether the third data comprises the feature of the first party, and for retrieving the first data associated with the second data if the third data comprises the feature of the first party.

BRIEF DESCRIPTION OF THE DRAWINGS

For a better understanding of the present invention reference will now be made by way of example only to the accompanying drawings in which.

DETAILED DESCRIPTION OF EMBODIMENTS OF THE INVENTION

Figure 1A:
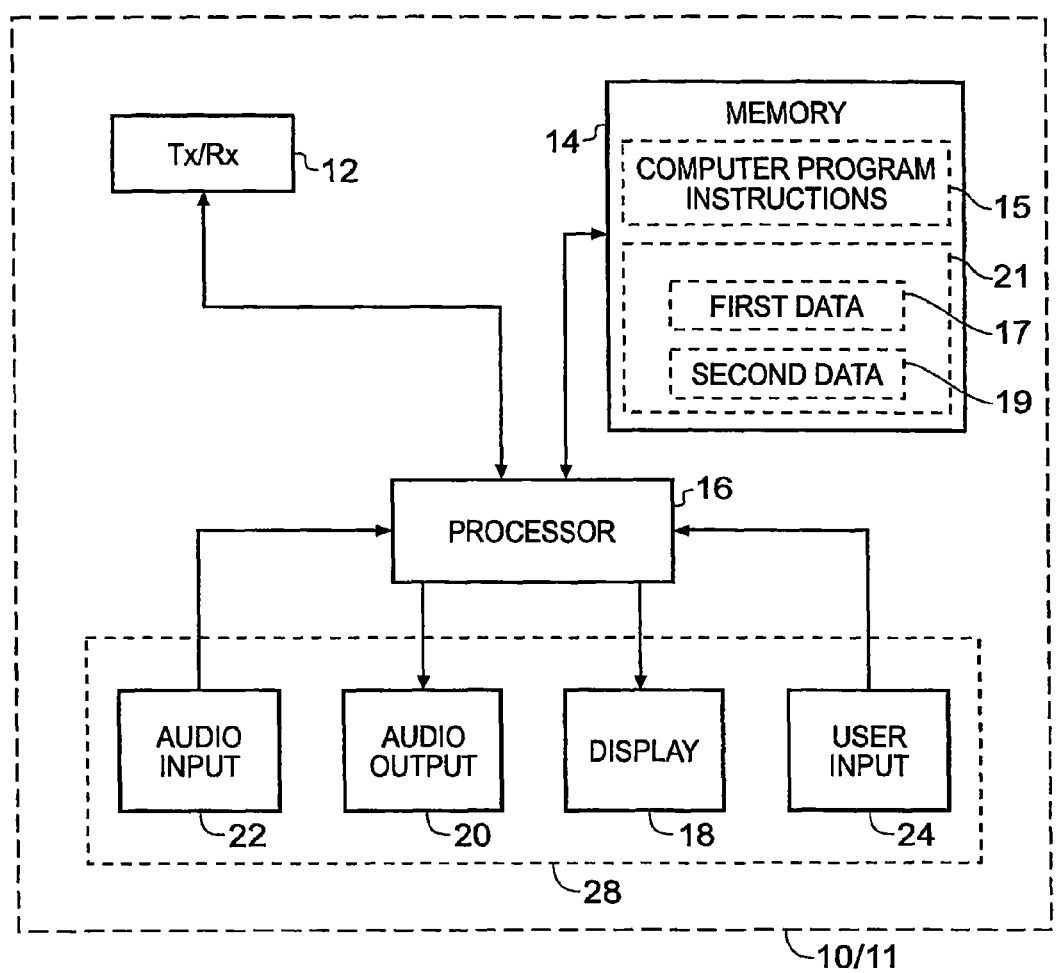
FIG. 1A illustrates an electronic device in the form of a mobile radiotelephone.

The Figures illustrate an electronic device 10, comprising: a transceiver 12 for conducting a telephone call with a first party; a storage device or devices 14 for storing first data 17 identifying the first party and second data 19 derived from a telephone call with the first party, the second data 19 being different to the first data 17 and characterizing a feature of the first party to allow future recognition of the first party by the electronic device 10; and a processor for associating the first data 17 with the second data 19.

FIG. 1A is a schematic illustration of an electronic device 10/mobile radio telephone 11. The device 10 may be hand portable. The device 10 comprises a radio frequency transceiver 12, a storage device/memory 14, a processor 16, and a user interface 28. The user interface 28 comprises a display 18, an audio output 20, an audio input 22 and a user input 24.

The transceiver 12 is operable to transmit and receive signals on a radio frequency telephone network. The processor 16 is connected to receive an input from the transceiver 12, the audio input 22 and the user input 24, and is connected to provide an output to the transceiver 12, the display 18, and the audio output 20. The processor is also connected to read from and write to the memory 14.

The user input 24 may comprise keypad having a, plurality of keys which enable a user to input commands into the electronic device 10. The user input 24 and the display 18 may be combined, for instance, in a touch sensitive display device.

The electronic device 10 illustrated in FIG. 1A is suitable for performing the method described in relation to FIGS. 2A, 2B, 2C and 3. Optionally, the electronic device 10 may also comprise a media/input output device and/or a camera. The media input/output device may provide a way of inputting data into the electronic device 10 from a removable source or outputting data from the electronic device 10 to a removable source. The removable source may be a flash memory card, hard drive or an optical storage medium. CD's and DVD's are examples of an optical storage media.

The storage device 14 is operable to store first data 17, second data 19 and computer program instructions 15. The first data 17 and second data 19 form part of an association 21. The storage device 14 may be a single memory unit, or a plurality of memory units. If the storage device 14 comprises a plurality of memory units, part or the whole of the first data 17, the second data 19 and the computer program instructions 15 may be stored in the same or different memory units.

The computer program instructions 15 control the operation of the electronic device 10 when loaded into the processor 16. The computer program instructions 15 provide the logic and routines that enables the electronic device 10 to perform the methods illustrated in FIGS. 2A, 2B, 2C and 3.

A portion of the computer program instructions 15 are for associating first data identifying a first party with second data to allow future recognition of the first party. The computer program instructions provide: means for instructing the memory 14 to store second data derived from a telephone call with the first party, the second data being different to the first data and characterizing a feature of the first party to allow future recognition of the voice of the first party; and means for associating the first data with the second data.

Figure 1B:
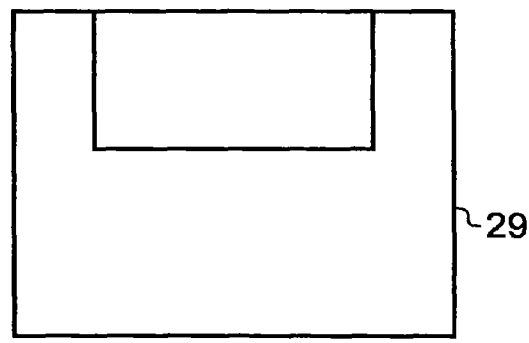
FIG. 1B illustrates a record medium for carrying a computer program.

The computer program instructions 15 may arrive at the electronic device 10 via an electromagnetic carrier signal or be copied from a physical entity such as a computer program product, a memory device or a record medium such as a CD-ROM or DVD. A record medium 29 is illustrated in FIG. 1B.

Figure 1C:
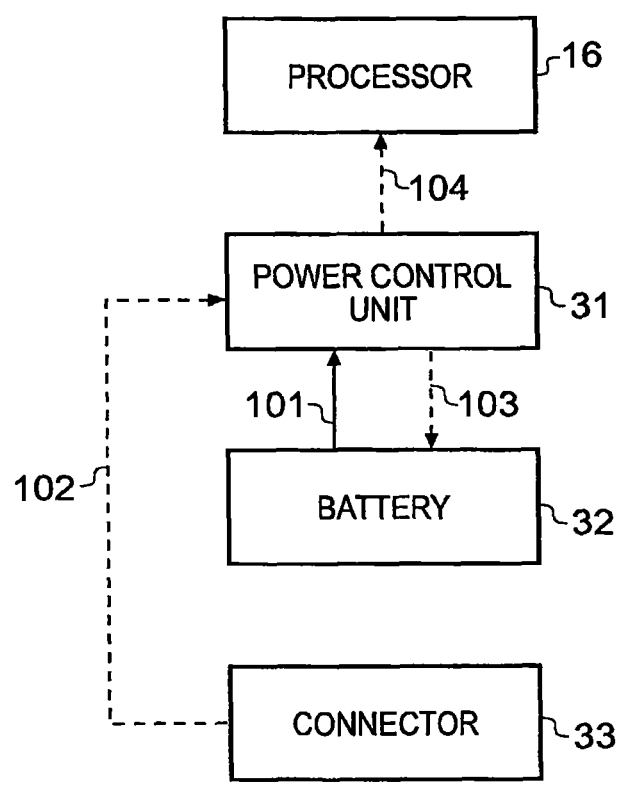
FIG. 1C illustrates an alternative embodiment of the electronic device.

FIG. 1C illustrates an embodiment of the invention in which the processor 16 is connected to receive an input from a power control unit 31. The power control unit 31 is connected to a battery 32. In normal operation, the battery 32 supplies power to the power control unit 31 (indicated by the solid line 101 in FIG. 1C), which then distributes the power to the electronic components of the device 10. When a connector 33 of the device 10 is connected to a mains power supply, power is sent from the connector 33 to the power control unit 31 (indicated by dotted line 102). The power control unit 31 then distributes power to the electronic components of the device 10, and recharges the battery 32 (indicated by dotted line 103).

Figure 2A:
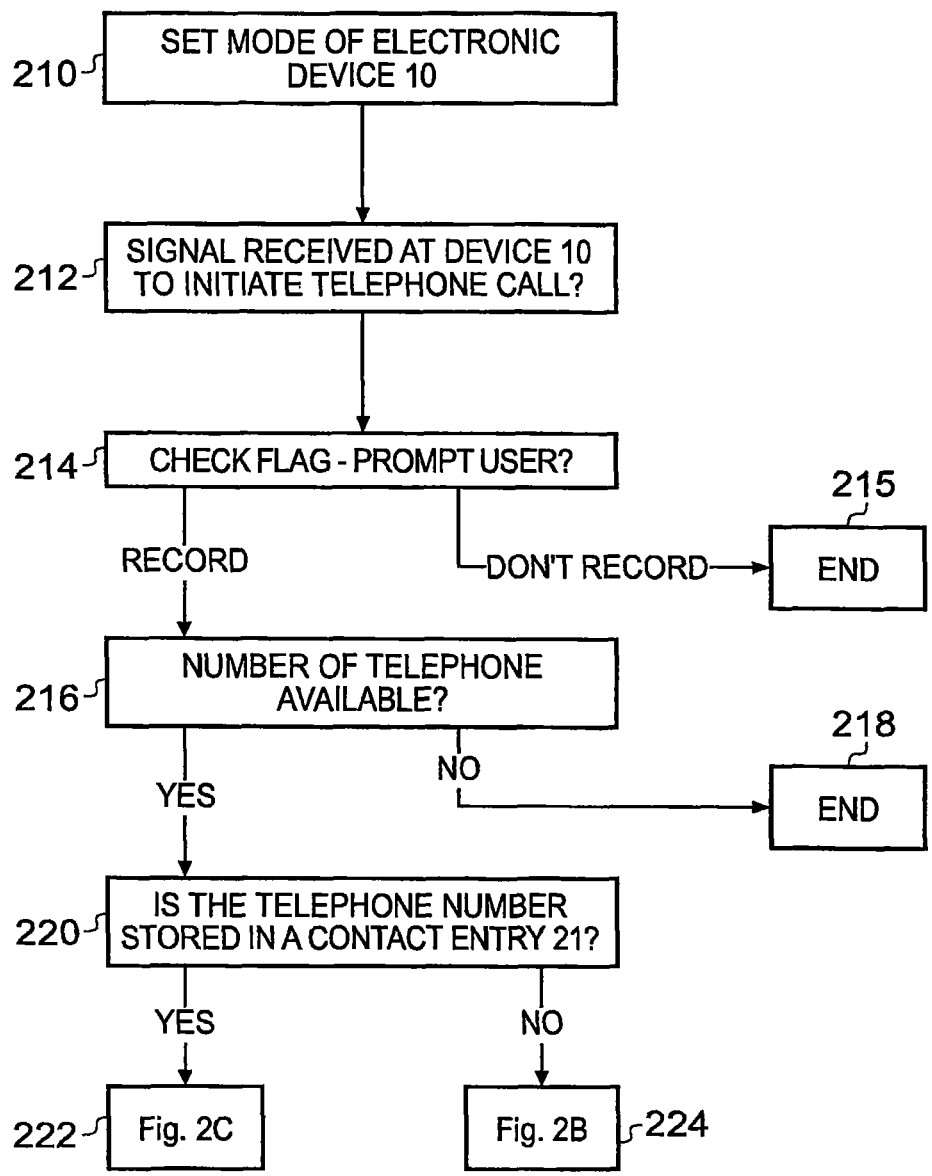
FIG. 2A illustrates a first part of a method to store voice information characterizing the voice of a first party in a memory of the electronic device.

Referring now to FIG. 2A, at step 210 the user of the electronic device 10 may select the mode of the device 10. The user may select a "record mode". In the record mode, audio samples of a first party/person at the other end of a telephone connection are recorded during a telephone call. When the user selects the record mode, a "record mode flag" is written to the memory 14 by the processor 16 at step 210.

As an alternative to the "record mode", the user may select a "prompt and record mode". When the user selects this mode, a "prompt and record mode flag" is written to the memory 14 by the processor 16 at step 210.

At step 212, the processor 16 receives a signal to initiate a telephone call while the device 10 is still "on hook". That is, a link which carries voice signals has not yet been established. In response to the initiation signal being received at the device 10, at step 214 the processor 16 reads from the memory 14 to check for the presence of a "record mode flag" or a "prompt and record mode flag".

If a "record mode flag" is found, the method proceeds to step 216. If a "prompt and record mode flag" is found, the processor 16 sends a signal to the display 18 to display a prompt. In the prompt, the user is asked whether he wishes to record an audio sample of the first party/person at the other end of the telephone connection during the telephone call. The user may then use the user interface 28 to instruct the device 10 not to record an audio sample. In that case, the method ends at step 215. Alternatively the user may instruct the device 10 to record an audio sample, and the method proceeds to step 216.

Before the telephone call commences, at step 216 the professor 16 determines whether the telephone number of the telephone at the other end of the connection is available using, for example, Caller Line Identification or from a memory buffer used to store a telephone number called. If the telephone number is not available, the method ends at step 218. If the telephone number is available, the processor 16 determines whether that telephone number is already stored in a contact entry stored in the memory 14 of the device 10 at step 220. If the number is stored in a contact entry, the method proceeds to step 222 and FIG. 2C. If the number is not stored in a contact entry, the method proceeds to step 224 and FIG. 2B.

A contact entry is an association 21 of data which comprises information about a first party. A contact entry 21 comprises at least one field for information 17 that may identify the first party, such as the name of the first party. For example, the contact entry 21 may also comprise fields for one or more telephone numbers associated with the first party, the postal address of the first party, the email address of the first party, and a picture of the first party.

Figure 2B:
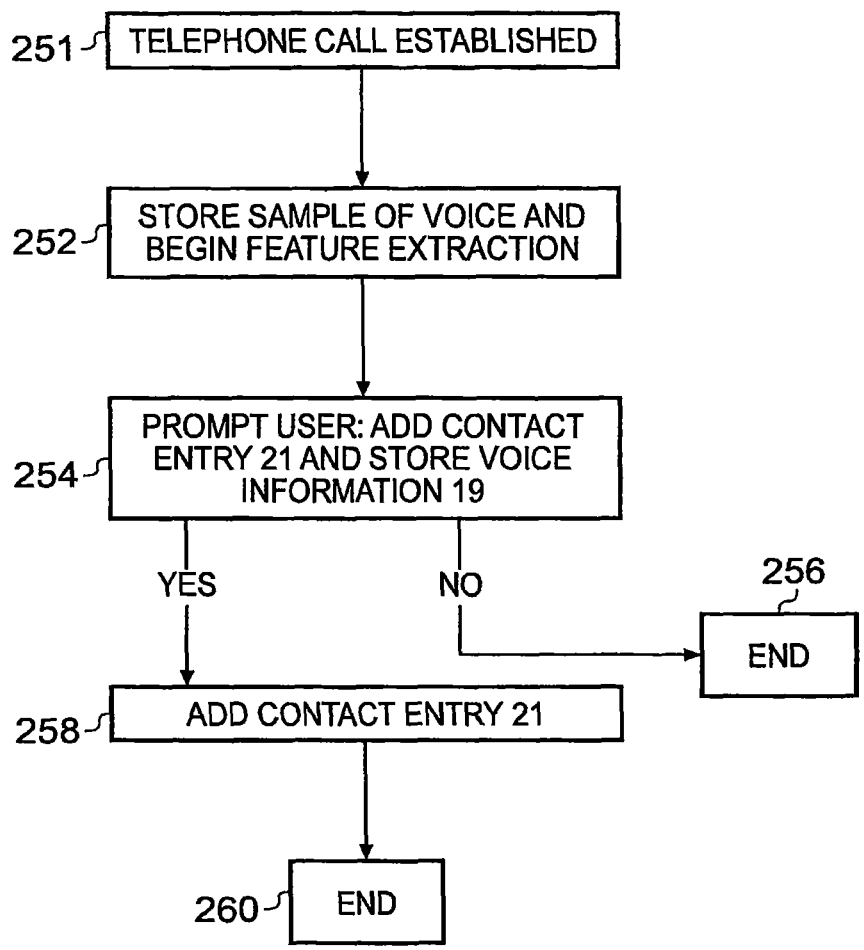
FIG. 2B illustrates a second part of the method to store voice information, where a telephone number associated with the first party is not being stored in the electronic device.

Referring now to FIG. 2B, where the telephone number is not already stored in a contact entry 21 in the memory 14, a telephone link which carries voice signals is established at step 251. At step 252, an audio sample of the voice of the first party is stored in the memory 14. At this point, the processor 16 may begin analyzing the audio sample to allow future recognition of the voice by the device 10. Alternatively, it may begin analysis of the audio sample at a later point in time, which may or may not be initiated by the user.

For instance, analysis of the audio sample may begin automatically when the current telephone call ends or it may begin automatically when the battery 32 of the device 10 is being recharged. The term "automatically" means that user intervention is not required.

In the embodiment where analysis of the audio sample begins when the battery is being recharged, the electronic device 10 may take the form described in relation to FIGS. 1A and 1C. In this embodiment, when the connector 33 is connected to a mains power supply, it sends a signal to the power control supply 31 as described above. The power control supply 31 then proceeds to recharge the battery 32, and sends a signal to the processor 16 (indicated by dotted line 104 in FIG. 1C), indicating that the device 10 has been connected to a mains power supply. In response to receiving that signal, the processor 16 initiates the analysis of the audio sample.

Following step 252, the method proceeds to step 254 where the processor 16 causes the display 18 to prompt the user. In the prompt, the user is asked whether he wishes to add a contact entry 21 including the newly acquired voice information 19. A contact entry 21 may have a specific field for the newly acquired voice information 19. The newly acquired voice information 19 may comprise an audio sample of the voice of the first party, features of the voice of the first party that have been extracted from the audio sample during the analysis of the sample, or a combination of the two. In particular, a combination of the two may be stored if the analysis of the audio sample has not been completed at this stage. Step 254 may occur when the telephone call with the first party ends.

If the user chooses not to add a contact entry 21 using the user interface 28, the method ends at step 256 and the voice information 19 stored in the memory 14 at step 252 is discarded by the processor 16. If the user chooses to add a contact entry 21 using the user interface 28, the processor 16 writes to the memory 14 so that a new contact entry 21 including the voice information 19 is added and stored in the memory 14 at step 258. When a new contact is added, the user may have an opportunity to add other information to the contact entry 21 about the first party, such as the name of the first party, the postal address of the first party, other telephone numbers associated with the first party, or a picture of the first party. The method then ends at step 260.

Figure 2C:
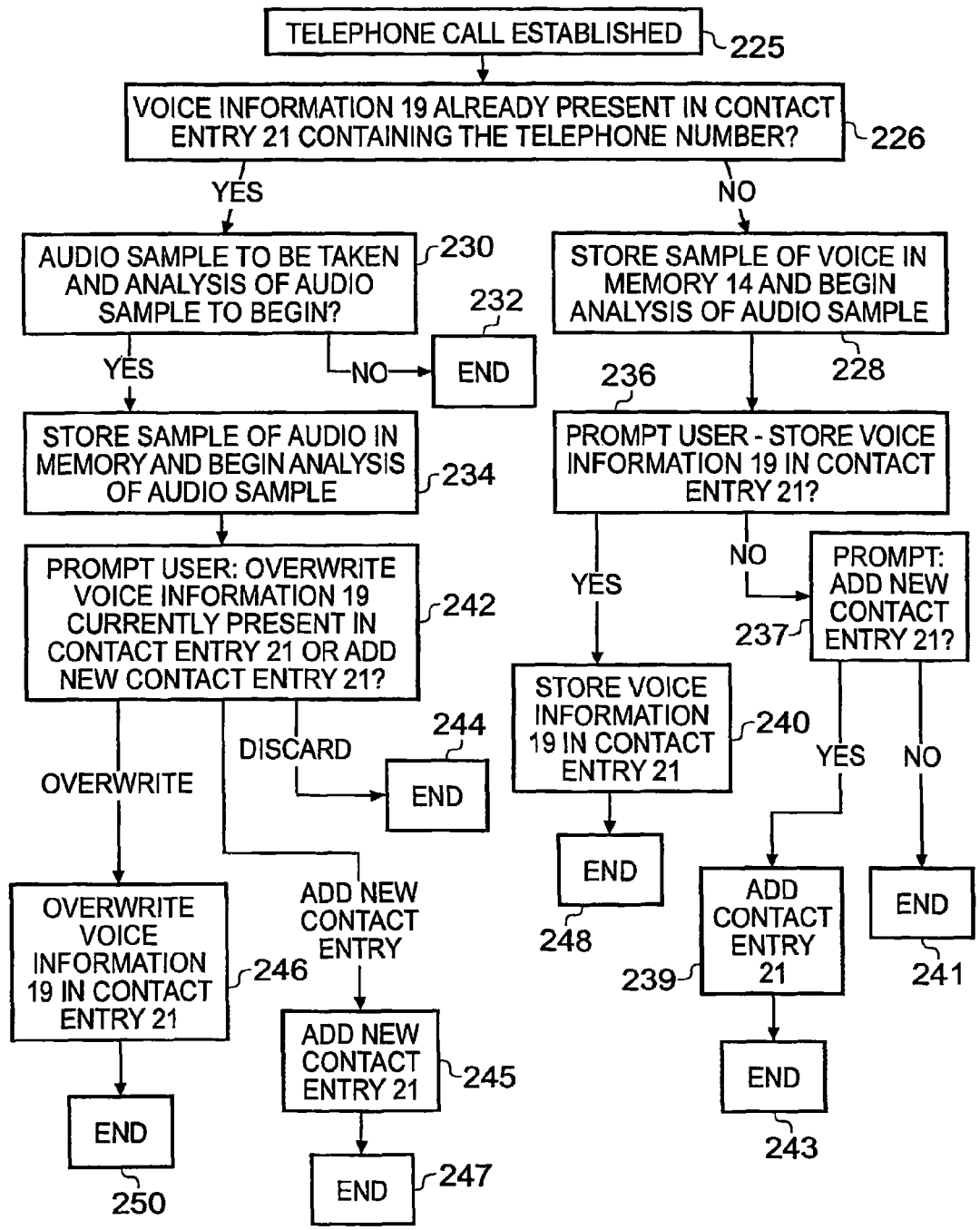
FIG. 2C illustrates an alternative second part of the method to store voice information, where a telephone number associated with the first party is being stored in the electronic device.

Referring now to FIG. 2C, where the telephone number of the first party with whom the telephone call is being conducted is already stored in a contact entry 21 in the memory 14, a telephone link which carries voice signals is established at step 225.

At step 226 of FIG. 2C, the device 10 determines whether voice information 19 is already present in the contact entry 21 containing the telephone number (i.e. it could be that the telephone number and the name of the first party are stored in the contact entry 21, but there is no voice information 19).

In a situation where voice information 19 is already present in the contact entry 21 containing the telephone number, at step 230, the processor 16 determines whether an audio sample is to be taken during the telephone call and whether analysis of the audio sample is to begin once it has been taken. The user of the device 10 may have previously selected, using the user interface 28 of the device 10, that if a particular contact entry 21 already contains voice information 19, no audio sample is to be taken, in which case the method ends at step 232.

Alternatively, it may be that the user has not selected such an option, or he may have positively selected that a voice sample is to be taken each time a telephone call is conducted, irrespective of whether voice information 19 is present in the contact entry 21. In this case, the method proceeds to step 234 where the processor 16 writes an audio sample of the voice to the memory 14. At this point, the device 10 may begin analyzing the audio sample to allow future recognition of the voice by the device 10. Alternatively, it may begin analysis of the audio sample at a later date, which may or may not be initiated by the user (as described in relation to step 252 of FIG. 2B).

At step 242, the processor 16 instructs the display 18 to display a prompt for the user. In the prompt, the user is asked if a) he wishes to overwrite the voice information 19 that is already stored in the contact entry 21 containing the relevant telephone number with the newly acquired voice information 19, or b) he wishes to add a new contact entry 21 containing that telephone number and the newly acquired voice information 19, or c) he wishes to discard the newly acquired voice information 19. As mentioned before in relation to step 254 of FIG. 2B, the newly acquired voice information 19 may comprise an audio sample of the voice of the first party, features of the voice of the first party that have been extracted from the audio sample, or a combination of the two. Step 242 may occur when the telephone call with the first party ends.

The user may choose not to store the recently acquired voice information 19, for instance, if he believes that it is of a poor quality. He may think this, for example, because the audio sample taken does not provide a typical sample of the voice of the party. This could be because, for instance, there was a large amount of background noise during the call or because the first party is ill and has a cold. In this situation, the user may choose to discard the voice information 19 using the user interface 28 and the method ends at step 244. If the user wishes to overwrite the voice information 19 that is already stored in the relevant contact entry 21 with the newly acquired voice information 19, he may select this option using the user interface 28 and the overwriting occurs at step 246. The method then ends at step 250.

If the user wishes to add a new contact entry 21 containing the newly acquired voice information 19, he may select this option using the user interface 28. The processor 16 then writes to the memory 14 so that a new contact is added and stored in the memory 14 at step 245. The method then ends at step 247.

In the situation where the voice information 19 for the first party is not already being stored in the relevant contact entry 21, the method proceeds from step 226 to step 228 at the start of FIG. 2C, where the processor 16 writes to the memory 14 to store an audio sample of the voice of the first party in the memory 14, and the processor 16 then begins to analyze the stored audio sample to extract features from the sample to allow future recognition of the voice by the device 10. Alternatively, it may begin analysis of the audio sample at a later point in time, which may or may not be initiated by the user (as mentioned in relation to step 252 of FIG. 2B and step 234 of FIG. 2C). The method then proceeds to step 236, where the processor 16 causes the display 18 to display a prompt, asking the user whether he wants to store the newly acquired voice information 19 in the contact entry 21 containing the telephone number.

As described previously in relation to step 258 of FIG. 2B and steps 242 and 246 of FIG. 2C, the newly acquired voice information 19 may comprise an audio sample of the voice of the first party, features of the voice of the first party that have been extracted from the audio sample to allow future recognition of the voice of the first party by the device 10, or a combination of the two.

If the user chooses to store the voice information 19 in the contact entry 21 using the user interface 28, the method proceeds to step 240, where the processor 16 writes to the memory 14 to store voice information 19 in the contact entry 21 containing the telephone number, and the method then ends at step 248. If the user chooses not to store the voice information 19 in the contact entry 21 containing the telephone number using the user interface 28, the processor 16 instructs the display 18 to display a further prompt asking the user whether he wishes to add a new contact entry 21 at step 237.

At this point, the user may choose to add a new contact entry 21 using the user interface 28, in which case the processor 16 writes to the memory 14 to store a new contact entry 21 at step 239, and the method ends at step 243. If the user uses the user interface 28 to indicate that he does not wish to add a new contact entry 21, the stored voice information 19 is discarded by the processor 16 and method ends at step 241.

Figure 3:
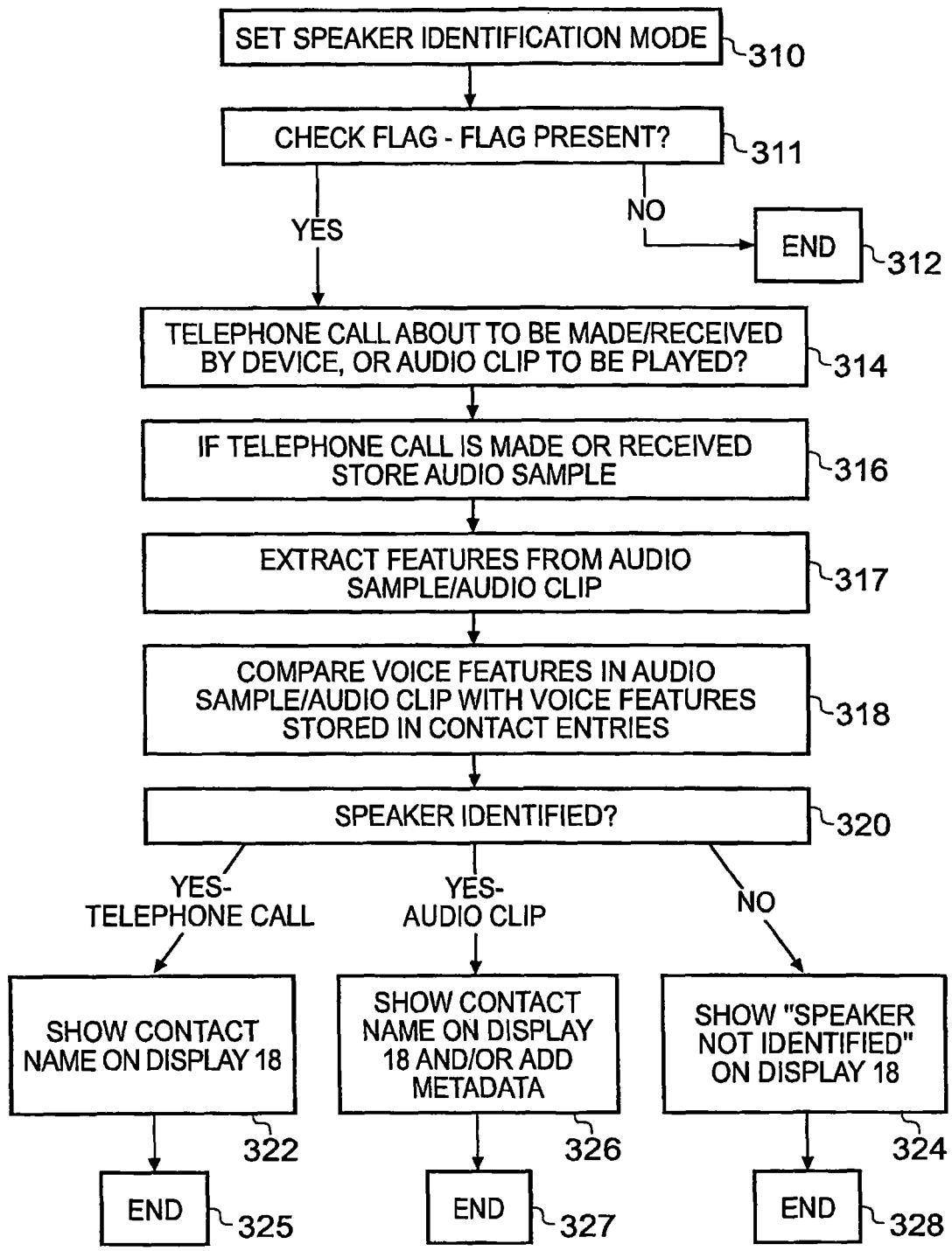
FIG. 3 illustrates a method of identifying the first party using voice information stored in memory of the electronic device.

FIG. 3 illustrates a flowchart for the second aspect of the invention, where information identifying a first party is retrieved if the voice of the first party is detected.

At step 310, the user may select a "speaker identification mode" using the user interface 28. If the user selects the speaker identification mode, the processor 16 writes a "speaker identification mode flag" to the memory 14. In the speaker identification mode, the device 10 identifies a party/person in an audio clip or telephone call by using the voice information 19 stored in the contact entries in the memory 14.

At step 311, the processor 16 reads from the memory 14 to check for the presence of a speaker identification mode flag. If a speaker identification mode flag is not found, the method ends at step 312. If a speaker identification mode flag is found the method proceeds to step 314, where the processor 16 determines if a telephone call is about to be made or received by the device 10 or the device 10 is about to playback an audio clip. The audio clip may be associated with a video clip or a picture. The audio clip may be stored in the memory of the device 14. Alternatively, the audio clip may be stored on a portable medium, such as a disc or a memory card. The processor 16 of the device 10 is able to read from and write to the portable medium using a media input/output device, as described above.

At step 316, if a telephone call is being made or received by the device 10, the processor 16 writes to the memory 14 to store an audio sample of the party with whom the telephone call is being conducted in the memory 14.

At step 317, the processor 16 analyses the audio sample from the telephone call or the audio data in the audio clip to extract voice features from it. The processor 16 then writes to the memory 14 to store the voice features. The processor 16 then compares those voice features with the voice features stored in each individual contact entry 21 that is stored in the memory 14 of the device 10, at step 318. The processor 16 may perform this task by going through the contact entries in alphabetical order. Alternatively, it may perform the task by going through the contact entries in a different way. For instance, the first contact entry 21 that is checked by the processor 16 could be the contact with whom telephone calls are most frequently conducted by the device 10, and the last contact entry 21 to be checked could be the contact with whom telephone calls are least frequently conducted. The other contact entries would be checked accordingly.

It could also be that the first contact to be checked is the contact entry 21 containing the voice which has been most frequently identified in the past by the device 10, and the last contact to be checked is the contact entry 21 containing the voice that has been least frequently identified.

If the voice features extracted from the audio sample/audio clip at step 317 and stored in the memory 14 are not matched by the processor 16 with voice features stored in a contact entry 21 stored in the memory 14 at steps 318 and 320, the processor 16 instructs the display 18 to display the words "speaker not identified" at step 324. The method then ends at step 328, where any audio sample recorded from a telephone call at step 316 and any voice features extracted at step 317 are discarded by the processor 16.

If a match is found using voice features obtained from an audio sample of a telephone call at step 320, the speaker is identified at step 320 and the processor 16 instructs the display 18 to display the name stored in the matching contact entry 21 at step 322. The method then ends at step 325.

If a match is found using voice features obtained from an audio clip, the method proceeds from step 320 to step 325, where the processor 16 instructs the display 18 to display the name stored in the matching contact entry 21 and/or writes to the memory 14 to store the name of the speaker in the memory 14 as metadata to the analyzed audio clip. The metadata to the audio clip indicates the names of the people that speak during the audio clip.

Alternatively, rather than storing the name of the speaker as metadata to the analyzed audio data, the processor 16 may write to the memory 14 to store a pointer as metadata to the analyzed audio data, which associates the name in the matching contact entry 21 with the analyzed audio data. The method then ends at step 327.

In an alternative embodiment of the invention, the user may select the "camera mode" of the electronic device 10 using the user interface 28. In the camera mode, the user is able to record video images and/or still photographic images using a camera. When the device is in the camera mode, an audio sample may be taken by the device 10, and then the same speaker identification processes described in relation to steps 317 to 320 take place for that audio sample. If a speaker is identified in the audio sample, metadata may be added to still photographs or video images recorded using the camera. The metadata may be added automatically when the speaker is identified. The term "automatically" means that user intervention is not required. The metadata indicates the people that were present during the period of time when the video images and/or still photographs were recorded.

Adding metadata to audio data, video clips/images and/or photographs, provides a user with a parameter that may be used to search through stored data. The user may select a "searching mode" of the electronic device 10 using the user interface 28 to search through stored data in order to identify metadata associating/specifying a particular contact name. The metadata also provides a means by which the data may be sorted.

Although embodiments of the present invention have been described in the preceding paragraphs with reference to various examples, it should be appreciated that modifications to the examples given can be made without departing from the scope of the invention as claimed. For example, the recording of an audio sample during a telephone call may be initiated by the user actuating a key on a keypad during the telephone call, rather than by setting the mode of the device 10 before the telephone call begins.

Embodiments of the invention have been described above in relation to voice recognition using audio data that is obtained from a telephone call. The term "telephone call" in this application refers to any communication at a distance that includes audio, and is not limited to calls that only contain audio.

Embodiments of the invention may be used with a variety of recognition techniques by using data that characterizes one or more features of a first party/person, and are not limited to voice recognition. In the examples given above, the characterizing feature of a person is the person's voice. However, a characterizing feature could be any feature which is inherent in a person, is influenced by the genetics of a person and/or is dependent on the anatomy of a person.

In a particular example the telephone call may be a video telephone call. In this example, one or more facial characteristics of a person may be obtained during the telephone call. This data may then be analyzed and data characterizing the one or more facial features may be stored in a contact entry 21. The stored data characterizing the facial feature/s of the person may be compared with video data to identify the person.

It could also be that a combination of different recognition techniques are used together to identify the first party. For example, one part of the stored data may characterize the facial feature/s of the first party and one part of the stored data may characterize the voice of the first party.

Embodiments of the invention have been described in relation to a portable electronic device such as a mobile radiotelephone. However, the electronic device could be any electronic device which is capable of communication. It may be, for instance, a telephone connected to a fixed line network, or a personal computer connected to the internet which is able to make telephone calls using Voice over IP (VoIP).

It will therefore be apparent to a person skilled in the art that the term "transceiver" used in the claims relates to a device that is operable to transmit and receive, and is not limited to a radio frequency transceiver as described in the description. The transceiver may, for instance, be the interface a telephone has with a fixed line network, or a personal computer's interface to the internet.

Furthermore, in the description of an embodiment of the invention given above, at step 216 of FIG. 2A, before the telephone call commences, the processor 16 determines whether the telephone number of the telephone at the other end of the connection is available using Caller Line Identification or from a memory buffer used to store a telephone number called. If the telephone number is not available, the method ends at step 218. However, it may be that the method does not end at this point, and instead the device 10 obtains voice information 19 during a telephone call, and provides the user with an option to store a contact entry 21 that contains voice information 19 and a name but does not contain a telephone number. Such a contact entry 21 may be used to identify a speaker during a telephone call or in audio data as indicated in FIG. 3.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method, comprising:
    establishing, at a first communication device, a telephone call between a first party using the first communication device and a second party using a second communication device;
    extracting, at the first communication device, second data derived from the telephone call with the second party, the second data being different from first data identifying the second party, wherein the second data comprises a unique identifier of the second party to allow future recognition of the second party, the unique identifier is based on at least one of a voice sample and a facial characteristic of the second party;
    associating, at the first communication device, the first data with the second data;
    determining, at the first communication device, whether a match exists between the second data and third data extracted from an image recorded by a camera of the first communication device;
    responsive to a positive determination, adding data to the recorded image to associate the second party with the recorded image; and
    prompting the first party to select one of overwriting second data already stored in a contact entry with the extracted second data and creating a new contact entry with the extracted second data.

2. The method according to claim 1, wherein the second data comprises voice features extracted from a recording of the voice of the second party, recorded during the telephone call.

3. The method according to claim 1, wherein the second data comprises a recording of the voice of the second party, recorded during the telephone call.

4. The method as according to claim 3, further comprising discarding the recording of the voice of the second party after voice features have been extracted.

5. The method according to claim 3, wherein voice features are extracted from the recording of the voice of the second party after the telephone call with the second party has ended.

6. The method according to claim 1, wherein the second data comprises a recording of the voice of the second party, recorded during the telephone call, and voice features extracted from the recording of the voice of the second party.

7. The method according to claim 1, further comprising determining whether a previously stored second data is available when a telephone number of the second party is available.

8. The method according to claim 1, further comprising comparing a previously stored second data with the extracted second data to determine whether the previously stored second data comprises the unique identifier of the second party.

9. The method according to claim 8, further comprising retrieving the first data associated with the second data when the previously stored second data comprises the unique identifier of the second party.

10. The method of claim 1, wherein the image comprises at least one of a video image and a photographic image.

11. An apparatus of a first communication device, comprising:
    at least one processor;
    at least one memory including computer program instructions;
    the at least one memory and the computer program instructions configured to, with the at least one processor, cause the apparatus at least to:
        establish a telephone call between a first party using the first communication device and a second party using a second communication device;
        extract second data derived from telephone call with the second party, where the second data is extracted from a recording made during the telephone call, the second data being different from first data identifying the second party, wherein the second data comprises a unique identifier of the second party to allow future recognition of the second party, the unique identifier is based on at least one of a voice sample and a facial characteristic of the second party;
        associate the first data with the second data;
        determine whether a match exists between the second data and third data extracted from an image recorded by a camera of the first communication device;

responsive to a positive determination, add data to the recorded image to associate the second party with the recorded image; and prompt the first party to select one of overwriting second data already stored in a contact entry with the extracted second data and create a new contact entry with the extracted second data.

12. A non-transitory computer readable storage medium tangibly embodying computer program instructions configured to, with at least one processor, perform operations, the operations comprising:

establishing a telephone call between a first party using a first communication device and a second party using a second communication device;

extracting second data derived from telephone call with the second party, where the second data is extracted from a recording made during the telephone call, the second data being different from first data identifying the second party, wherein the second data comprises a unique identifier of the second party to allow future recognition of the second party, the unique identifier is based on at least one of a voice sample and a facial characteristic of the second party;

associating the first data with the second data;

determining whether a match exists between the second data and third data extracted from an image recorded by a camera of the first communication device;

responsive to a positive determination, adding data to the recorded image to associate the second party with the recorded image; and prompting the first party to select one of overwriting second data already stored in a contact entry with the extracted second data and creating a new contact entry with the extracted second data.

* * * * *